Patented Oct. 19, 1926.

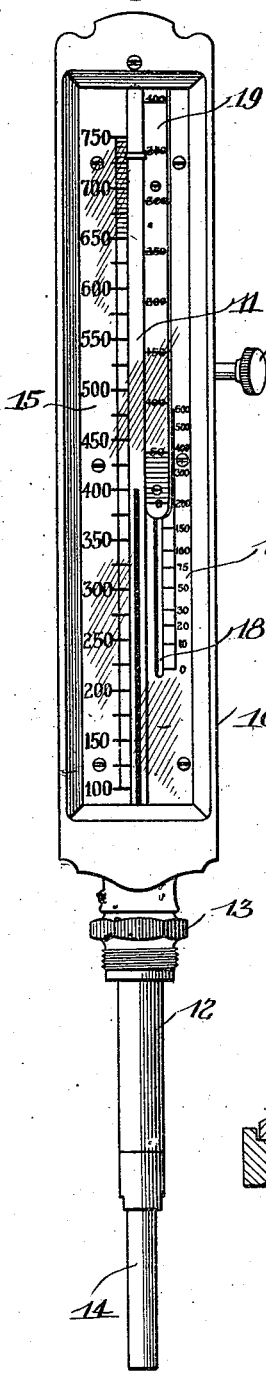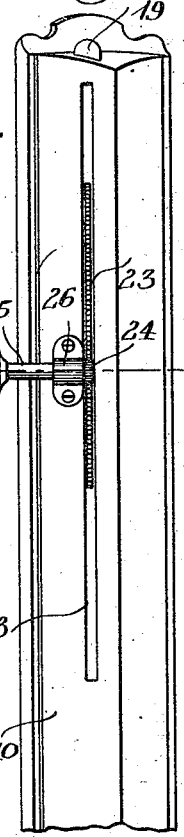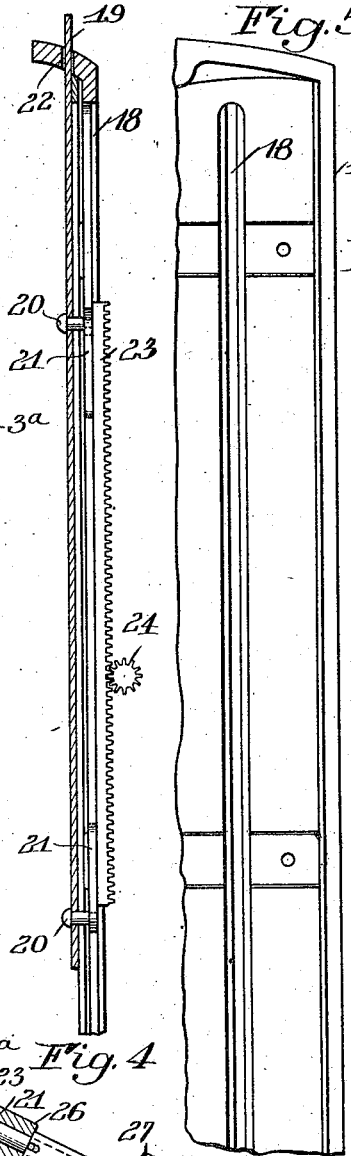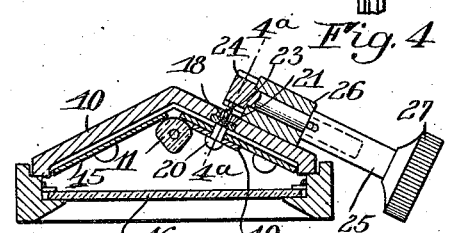

1,603,316

UNITED STATES PATENT OFFICE.

CHARLES B. CARSON, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER.

Application filed August 25, 1925. Serial No. 52,314.

My invention relates to thermometers of a variety, for example, adapted for use with a boiler, pipe line or the like, for indicating the temperature of steam, one object of the invention being to provide a thermometer of this type adapted to indicate directly the number of degrees of super-heat of steam, without the necessity of reference to steam tables or other charts. Another object is the provision of such a thermometer having means adapted to be readily set to correspond with an observed steam pressure and to indicate directly the degrees of super-heat of steam at any given temperature and pressure within the usual working range. A further object is to provide an instrument of the above character in a complete and convenient form adapted to indicate actual steam temperature and comprising conveniently adjustable means adapted to be readily set to a corresponding observed pressure to thereby indicate directly also the degrees of super-heat in the steam.

To these and other ends the invention resides in certain improvements and combination of parts, all as will be hereinafter more fully described, the novel features being pointed out in the claims at the end of the specification.

In the drawings:

Figure 1 is a front elevation of a thermometer embodying the present invention.

Figure 2 is a perspective rear view of a portion of the same.

Figure 3 is an enlarged sectional view on the line 3ª—3ª in Figure 2.

Figure 4 is an enlarged sectional view on the line 4ª—4ª in Figure 3.

Figure 5 is a front elevation of a portion of the casing with the scale plates removed; and Figure 6 is a detail view of an operating rack portion detached.

Similar reference numerals throughout the several views indicate the same parts.

The invention is embodied in the present instance, by way of illustration, in an index thermometer of the liquid column type adapted for insertion through a boiler wall or into a steam pipe line, as well understood in the art. This embodiment comprises preferably a V shaped scale-case indicated generally at 10, in which is mounted a glass thermometer tube 11 having a stem portion 12 provided with a swivel nut 13 for mounting the instrument in a socket or other supporting means with its bulb portion 14 in the steam, the temperature of which is to be indicated. At 15 is the usual or any suitably fixed scale having graduations marked in terms of degrees of temperature and cooperating with the thermometer stem and liquid column to indicate the actual temperature of the steam or other medium to which the bulb is subjected. At 16 is the glass front enclosing the scale-case, and the instrument, as so far described, is of known construction and therefore needs no further explanation.

It has been found that an instrument of the above character may have combined therewith a device adapted to be set with reference to the steam pressure observed from a gauge and corresponding with the temperature appearing on the scale 15, to indicate directly the number of degrees of super-heat in the steam at the given temperature and pressure so that this measurement may be made and directly indicated solely by means of the thermometer without computations and without slow and cumbersome reference to steam tables, charts and the like. This result is obtained in the present embodiment by providing on the side of the scale-case 10 opposite the fixed temperature scale 15, a fixed pressure scale 17 corresponding to the ordinary range of steam pressures. The casing adjacent this scale is slotted as at 18 and in this slot is slidably mounted an adjustable scale strip 19 provided with graduations marked in degrees of temperature such as employed on the fixed temperature scale 15. Scale 19 is secured as by means of rivets 20 to shoes 21, sliding in a rabbeted portion of slot 18, as shown, so that the scale may be adjusted vertically to set the zero of the scale at its lower end to any selected pressure on scale 17, the top of the scale-case being for this purpose formed with an opening 22 through which the upper end of scale 19 may play. Secured to the rear sides of shoes 21 is a rack 23 meshing with a pinion 24 on a spindle 25 rotatably supported in bearings 26 at the back of the scale-case and carrying a knurled thumb piece or nut 27 projecting conveniently at the side of the casing.

It is apparent that by turning nut 27, the auxiliary temperature scale 19 may be quickly adjusted to set its zero point to coincide with any selected pressure on scale 17 corresponding to the observed gauge pressure of the steam. The reading on scale 19 then indicated by the top of the mercury column of the thermometer tube gives the number of degrees of super-heat in the steam at the given temperature. Thus, as shown in Figure 1, auxiliary scale 19 has been set to a pressure 200 on scale 17 corresponding to an observed steam pressure of 200 pounds per square inch. The mercury column then stands at, approximately, 15° F. on scale 19, so that the steam, at a pressure of 200 pounds and temperature of 400° is shown to contain, approximately, 15° super-heat.

The invention thus provides an instrument of practical self-contained form adapted to simultaneously indicate the steam temperature and by a simple setting in accordance with an observed gauge pressure, to indicate directly the number of degrees of super-heat corresponding to such pressure and temperature, thereby obviating the inconvenience, waste of time and likelihood of error attendant upon the resort to tables and charts for such data.

I claim as my invention:

1. A thermometer having a scale for indicating actual temperature, a pressure scale and an auxiliary temperature scale adjustable relative to said pressure scale for indicating directly the number of degrees of superheat of a gas represented by said actual temperature and the corresponding pressure.

2. A thermometer comprising a temperature sensitive indicating means, a fixed pressure scale, and a movably mounted temperature scale cooperating with said pressure scale and indicating means, to indicate the number of degrees of superheat in a gas at a given pressure.

3. A thermometer comprising a temperature sensitive indicating means, a fixed temperature scale therefor, a pressure scale, a slidably mounted auxiliary temperature scale adapted to be set with reference to any selected pressure on said pressure scale corresponding to a temperature indicated on said fixed temperature scale for co-operation with said indicating means to indicate directly the number of degrees of superheat of a gas at a given temperature and pressure.

CHARLES B. CARSON.